(12) United States Patent
Scholten et al.

(10) Patent No.: US 9,909,653 B2
(45) Date of Patent: Mar. 6, 2018

(54) MANUAL TORQUE ADJUSTER

(75) Inventors: Michael Scholten, Blons (AT); Robert Galehr, Mauren (LI)

(73) Assignee: ThyssenKrupp Presta AG, Eschen (LI)

( * ) Notice: Subject to any disclaimer, the term of this patent is extended or adjusted under 35 U.S.C. 154(b) by 467 days.

(21) Appl. No.: 13/884,085

(22) PCT Filed: Dec. 8, 2011

(86) PCT No.: PCT/EP2011/006180
§ 371 (c)(1),
(2), (4) Date: May 8, 2013

(87) PCT Pub. No.: WO2012/076175
PCT Pub. Date: Jun. 14, 2012

(65) Prior Publication Data
US 2013/0237353 A1  Sep. 12, 2013

(30) Foreign Application Priority Data
Dec. 10, 2010  (DE) .......... 10 2010 054 135

(51) Int. Cl.
  *F16H 7/14*  (2006.01)
  *F16H 7/02*  (2006.01)
  *B62D 5/00*  (2006.01)
  *H02K 11/215*  (2016.01)
  *H02K 7/116*  (2006.01)

(52) U.S. Cl.
  CPC .............. *F16H 7/14* (2013.01); *B62D 5/006* (2013.01); *F16H 7/023* (2013.01); *H02K 11/215* (2016.01); *H02K 7/116* (2013.01)

(58) Field of Classification Search
  CPC ......... B62D 5/046; B62D 5/006; H02P 6/181; F16H 7/14; F16H 7/023; H02K 11/215
  See application file for complete search history.

(56) References Cited

U.S. PATENT DOCUMENTS

| 4,967,480 A | * | 11/1990 | DeLuca | ................. G01B 5/255 33/203.18 |
| 6,820,713 B2 | | 11/2004 | Menjak et al. | |
| 7,044,263 B2 | * | 5/2006 | Fischbach | ............ B62D 5/0424 180/443 |
| 7,187,153 B2 | * | 3/2007 | Imagawa | ............... B62D 5/046 318/560 |

(Continued)

OTHER PUBLICATIONS

International Preliminary Report on Patentability issued in PCT/EP2011/006180, dated Nov. 26, 2013. English Translation.

*Primary Examiner* — Adam Tissot
*Assistant Examiner* — Aaron Smith
(74) *Attorney, Agent, or Firm* — Panitch Schwarze Belisario & Nadel LLP

(57) ABSTRACT

The invention relates to a manual torque adjuster for a motor vehicle steering system, having an electric motor (1), which has a pinion which is arranged on a motor shaft (6) on the output side of said electric motor (1), which pinion drives a belt pulley (3) via a toothed belt (2), and having a sensor unit (20), which is suitable for sensing the position of the motor and which is connected to an electronic controller which controls the electric motor (1), characterized in that the sensor unit (20) is arranged near to the output-side end of the motor shaft (6).

10 Claims, 2 Drawing Sheets

(56) References Cited

U.S. PATENT DOCUMENTS

| | | | |
|---|---|---|---|
| 7,448,466 B2* | 11/2008 | Miller | B62D 5/0406 180/444 |
| 8,368,266 B2* | 2/2013 | Jiang | B62D 5/0403 310/71 |
| 8,441,252 B2* | 5/2013 | Suzuki | G01D 5/145 324/200 |
| 2003/0164060 A1* | 9/2003 | Menjak | B62D 1/105 74/552 |
| 2004/0011585 A1* | 1/2004 | Menjak | B62D 5/006 180/402 |
| 2005/0121251 A1* | 6/2005 | Ueno | B62D 5/0409 180/444 |
| 2007/0131475 A1* | 6/2007 | Matsubara | B62D 5/0403 180/443 |
| 2008/0023257 A1* | 1/2008 | Budaker | B62D 5/0412 180/444 |
| 2008/0119986 A1* | 5/2008 | Wei | B62D 15/0245 701/41 |

* cited by examiner

MANUAL TORQUE ADJUSTER

CROSS-REFERENCE TO RELATED APPLICATIONS

This application is a National Stage of PCT International Application No. PCT/EP2011/006180, filed on Dec. 8, 2011, and claims priority of German Patent Application No. 10 2010 054 135.4, filed on Dec. 10, 2010. The disclosures of the aforementioned applications are incorporated herein in their entirety by reference.

FIELD OF ENDEAVOR

The present invention relates to a manual torque adjuster.

BACKGROUND

The use of steering systems without a direct mechanical coupling between the steering wheel and the steering gear in motor vehicles is known. Such steering systems are referred to as steer-by-wire steering systems (SbW steering systems). It is necessary in such systems to transmit torques, which correspond to the driving feel of a conventional steering system, to the driver via the steering wheel. Said torques are, for example, torques of inertia and return torques which originate from driving surface influences and steering kinematics. If it is not possible to sense such torques on the steering wheel, safe driving of the motor vehicle by the driver is difficult.

Manual torque adjusters come in various types. It is known in the case of such actuators from U.S. Pat. No. 6,820,713 B2, to create a particularly compact design of the upper steering shaft connected to the steering wheel in an axial direction wherein the required electric motor is arranged axially parallel next to the steering shaft and is coupled to the steering shaft via a belt drive. The electric motor does not extend beyond the length of the steering shaft.

Essential for the acceptance of such steering systems is an extremely precise regulation of the electric motor which generates the manual torque. It is necessary for such regulation to provide the electric motor with a motor position sensor which indicates the current position and, where appropriate, also the angle of rotation speed and direction of the rotor. In known manual torque adjusters, said sensor sits on the free end of the motor shaft which is opposite the output side.

The associated electronics are generally also arranged on the side facing away from the output side of the electric motor. Thus the configuration of the electric motor is extended in an axial direction which is undesirable in particularly compact arrangements. In particular the arrangement of the motor position sensor, also defines the position of the electronic control unit (ECU) of the manual torque adjuster within narrow limits since efforts are made to keep the electric cables between the sensor and the ECU short.

Proceeding from said prior art, the problem to be solved by the present invention is to provide a manual torque adjuster for a SbW steering system which is particularly short in an axial direction.

SUMMARY OF VARIOUS ASPECTS OF THE DISCLOSURE

This problem may be solved by a manual torque adjuster having various features, e.g., as may be recited in one or more of the attached claims.

Because the motor position sensor is arranged on the output side of the shaft end, the electric motor can directly round off the bearing of the motor shaft with its motor housing on the side opposite the output side. A requirement for space is indicated by the necessary mechanical force transmission elements on the output side or gear end of the electric motor; said space is not exploited fully by the mechanical components. If the motor position sensor is arranged in said region, then this part of the space available is used more effectively.

It is advantageous if the output side of the electric motor is provided with a pinion, for example, a toothed belt pinion, and the shaft end of the motor shaft supports a permanent magnet arrangement because the magnetic field rotating during operation can then be detected easily.

If a mounting block is also attached to the pinion-side bearing bracket of the electric motor, which extends beyond the free end of the motor shaft, the motor position sensor can be attached to said mounting block. It is advantageous here if the mounting block is located in the region around which the toothed belt loops. This embodiment makes it possible to fit the mounting block onto the bearing bracket before the toothed belt is fitted.

It is also advantageous if the motor position sensor is connected to an electronic controller ECU via electric cables, where said controller is arranged on the side of the toothed belt opposite the motor because the motor position sensor, the electric connection and the ECU are then located outside the field of interference of the electric motor. In a conventional arrangement of the motor position sensor on the opposite shaft end, a positioning of the ECU in the region of the belt drive or at the distance from the electric motor would require the connection cables between the motor position sensor and the ECU to lead out of the electric motor and, where possible, run parallel to the motor housing. This would have an undesirable effect on the signal from the motor position sensor.

The mounting block preferably has a base which is attached to the bearing bracket of the electric motor and which extends parallel to and at a distance from the motor pinion, as well as an annular region which partially encloses the motor pinion and which surrounds the outside of the magnet arrangement on the front side of the motor shaft. A positioning aid for the motor position sensor, for example in the form of alignment pins which enable the custom fitting of the sensor, can be provided in this annular region.

Finally, it is an advantage if the motor is attached using screws in the region of the output side of its bearing bracket to a housing part which is provided with elongated holes in this region. The motor can then be positioned when fitting in such a way that the toothed belt is tensioned in the manner intended. This is facilitated or actually made possible in the present case through the arrangement of the motor position sensor as per the invention because the motor position sensor can be connected to the ECU at the defined fitting position using short cables, said ECU being connected to the drive housing separately from the motor. The positioning of the motor for tensioning the toothed belt then effects a displacement of the motor position sensor, but not the ECU. The number of components to be moved for belt tensioning is thus minimised. This reduces the available space to be provided for the manual torque adjuster and improves the packaging.

BRIEF DESCRIPTION OF THE DRAWINGS

Embodiments of the present invention are described in greater detail below on the basis of the drawings.

DETAILED DESCRIPTION

Figure 1:
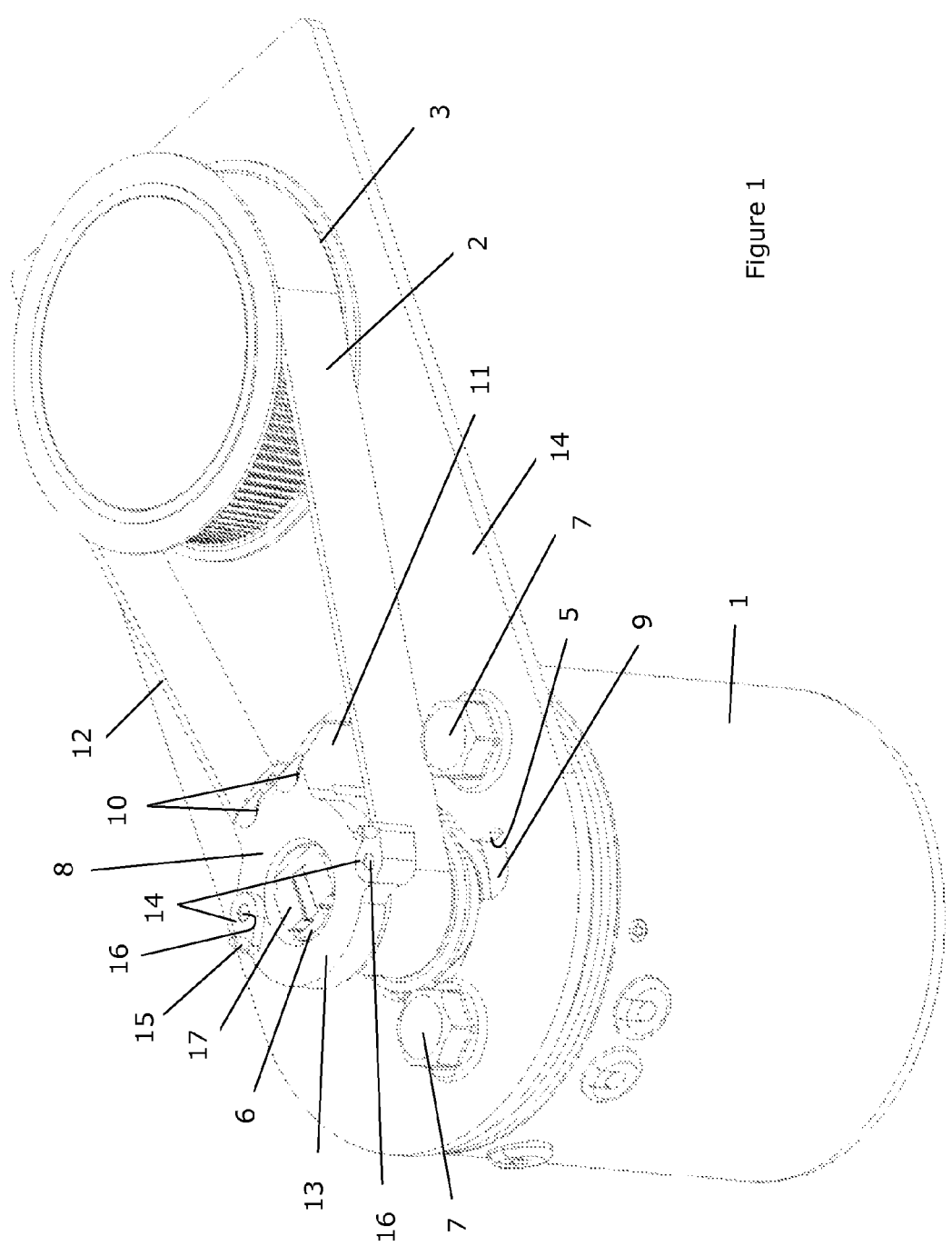
FIG. 1 shows a perspective representation of the electric motor and the belt drive of a manual torque adjuster.

FIG. 1 shows an electric motor 1 having a belt drive which is comprised of a toothed belt 2 and a belt pulley 3. The belt pulley 3 serves as a drive for an upper steering shaft of a sbw steering system that is not shown which is, in turn, coupled to a steering wheel. The electric motor 1 is attached to a plate 4 which is part of the housing of the manual torque adjuster. The plate 4 has a break through 5 which is penetrated by a motor shaft 6 of the electric motor 1 and by the pinion 27 arranged thereon in a torque proof manner, which cannot, however, be seen in FIG. 1. The plate 4 also has a total of 3 elongated holes through which the motor 1 is attached to the plate 4 by means of threaded screws 7. The elongated screws allow a displacement of the motor 1 for tensioning of the toothed belt 2.

The break through 5 in the plate 4 encloses the region of the bearing of the shaft 6 and also extends in the direction of the region around which the toothed belt 2 loops. A mounting block 8 is arranged in said region which is not visible in FIG. 1. The mounting block 8 sits on a bearing bracket 9 of the electric motor 1 and is attached there using two threaded screws 10. When the electric motor 1 is displaced in order to tension the toothed belt 2, the mounting block 8 moves with the electric motor 1 opposite the plate 4. The allocation of mounting block 8 and motor shaft 6 remains intact during belt tensioning. The mounting block 8 has a base 11 that runs parallel to the axis of rotation of the motor shaft 6; said base curves towards the motor shaft above the plane which is defined by an upper edge 12 of the toothed belt 2. The mounting block supports an annular attachment region 13 there which extends beyond the motor shaft 6 and encloses it in a substantially axial manner. The attachment region 13 finally supports two flange-like bearing plates 14 with positioning pegs 15 arranged thereon and threaded holes 16 for attaching an element. The motor shaft 6 supports a permanent magnet arrangement 17 on its free end, which is located within the attachment region 13, wherein said magnet arrangement rotates with the motor shaft during operation.

Figure 2:
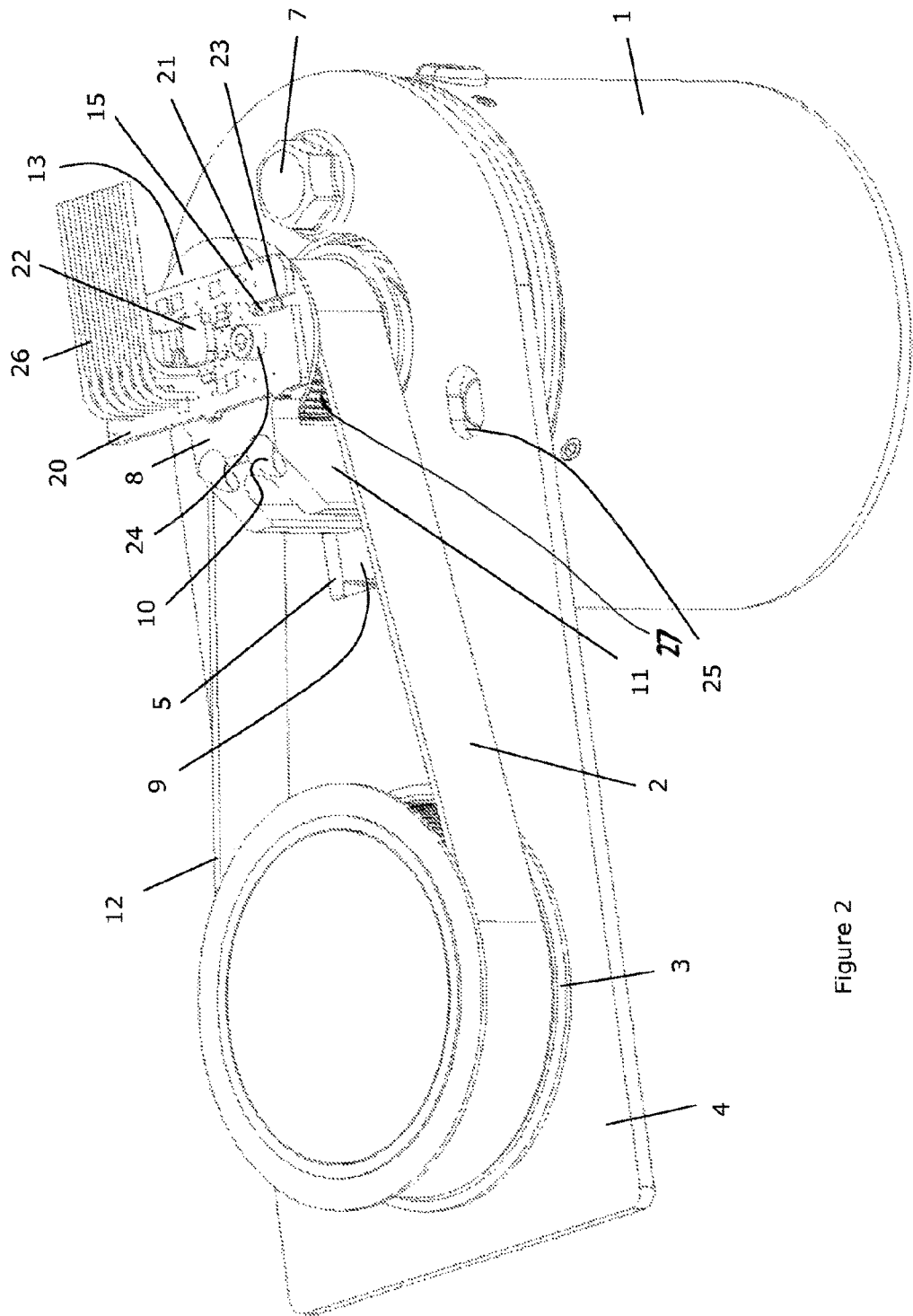
FIG. 2 shows the components from FIG. 1 with attached motor position sensor.

FIG. 2 shows the arrangement from FIG. 1 from a different view and with a motor position sensor 20 placed on the mounting block 8. The motor position sensor 20 has a base plate on which the required sensors and electronic components 22 are arranged in a known manner. The base plate 21 is also provided with cut-outs 23 which, together with the positioning pegs 15, ensure a precise arrangement of the components 22 in the permanent magnet arrangement 17. The base plate 21 is attached to the threaded holes 16 from FIG. 1 using threaded screws 24.

One of the three attachment screws 7 for fixing the electric motor 1 to the plate 4 has been removed in the diagram in FIG. 2 thereby showing an elongated hole 25, the function of which has already been described above. The motor pinion 27 can also be seen in this diagram below the annual attachment region 13. Finally, this diagram also shows the region of the break through 5 in which the mounting block 8 is attached to the bearing bracket 9 and consequently, if the electric motor is displaced in the direction of the elongated hole 25, the mounting block 8 also moves opposite the plate 4.

The sensor unit 20 is connected to an ECU that is not shown via a plurality of electric cables 26. It can be arranged above the belt drive, for example, on the side opposite the electric motor 1 and consequently is located outside the field of interference of the electric motor 1.

The electric cables 26 are connected to a plug that is not shown. The diagram according to FIG. 2 shows that with the arrangement of the mounting block 8 within the region around which the toothed belt 2 loops, it is easily possible when fitting to fit the toothed belt 2 onto the belt pulley 3 and the motor pinion 27 even when the mounting block 8 and the sensor unit 20 are already fitted. It can also be seen that the sensor unit 20 can be fitted separately from the electric motor 1. Consequently, it is not necessary to integrate the sensor unit 20 into the motor when manufacturing the electric motor 1. It is in fact possible to use an electric motor without a sensor system and to add the sensor unit 20 at a later stage in the fitting procedure. Different sensor units 20 can also be used for different motor vehicle models, depending on the design of the manual torque adjuster, wherein the electric motor 1 used can be the same for all models. This reduces the variety of parts since only one type of electric motor 1 is used.

It can also be seen from FIG. 2 that the sensor unit 20 is arranged at a distance from the electric motor 1. This reduces the influence of fields of interference of the electric motor 1 on the sensor unit.

REFERENCE SIGNS

1. Electric motor
2. Toothed belt
3. Belt pulley
4. Plate
5. Break through
6. Motor shaft
7. Threaded screws
8. Mounting block
9. Bearing bracket
10. Screws
11. Base
12. Upper edge
13. Attachment region
14. 
15. Positioning strips
16. Threaded holes
17. Permanent magnet arrangement
20. Sensor unit
21. Base plate
22. Components
23. Cut-outs
24. Threaded screws
25. Elongated hole
26. Electric cables
27. Pinion

What is claimed is:

1. A manual torque adjuster in a motor vehicle steering system, including:
    an electric motor having a pinion arranged on a motor shaft on an output side of said electric motor,
    a belt pulley coupled to transmit torque to a steering shaft physically coupled to a steering wheel of the steering system,
    a toothed belt, wherein the pinion is configured to drive the belt pulley via the toothed belt,
    a mounting block attached to an output-side bearing bracket of the electric motor which extends beyond a free end of the motor shaft, a sensor unit placed on, and attached to, the mounting block and configured to sense a position of the motor, the sensing unit being connected to an electronic controller that controls the electric motor, and at least one magnet attached to the output-side end of the motor shaft, wherein the at least one magnet is arranged so that a magnetic field of the at least one magnet is detectable by the sensor unit.

2. The manual torque adjuster according to claim 1, wherein the mounting block is arranged in a region around which the toothed belt loops.

3. The manual torque adjuster according to claim 1, wherein the electronic controller is connected to the sensor unit via electric cables and is arranged on an opposite side of the toothed belt from a side of the toothed belt on the electric motor is arranged.

4. The manual torque adjuster according to claim 1, further including a positioning aid provided for the sensor unit in an annular portion of the mounting block.

5. The manual torque adjuster according to claim 1, further including an output-side bearing bracket of the electric motor, wherein the output-side bearing bracket of the electric motor is attached to a housing part using screws, which housing part is provided with elongated holes configured to enable belt tensioning.

6. A manual torque adjuster in a motor vehicle steering system, including:
   an electric motor having a pinion arranged on a motor shaft on an output side of said electric motor,
   a belt pulley coupled to transmit torque to a steering shaft physically coupled to a steering wheel of the steering system,
   a toothed belt, wherein the pinion is configured to drive the belt pulley via the toothed belt,
   a mounting block attached to an output-side bearing bracket of the electric motor which extends beyond a free end of the motor shaft,
   a sensor unit placed on, and attached to, the mounting block and configured to sense a position of the motor, the sensing unit being connected to an electronic controller that controls the electric motor,
   and an output-side bearing bracket of the electric motor, wherein the output-side bearing bracket of the electric motor is attached to a housing part using screws, which housing part is provided with elongated holes configured to enable belt tensioning.

7. The manual torque adjuster according to claim 6, further including at least one magnet attached to the output-side end of the motor shaft, wherein the at least one magnet is arranged so that a magnetic field of the at least one magnet is detectable by the sensor unit.

8. The manual torque adjuster according to claim 6, wherein the mounting block is arranged in a region around which the toothed belt loops.

9. The manual torque adjuster according to claim 6, wherein the electronic controller is connected to the sensor unit via electric cables and is arranged on an opposite side of the toothed belt from a side of the toothed belt on the electric motor is arranged.

10. The manual torque adjuster according to claim 6, further including a positioning aid provided for the sensor unit in an annular portion of the mounting block.

\* \* \* \* \*